US012746686B2

(12) United States Patent
Quinlan et al.

(10) Patent No.: US 12,746,686 B2

(45) **Date of Patent: *Sep. 29, 2026**

(54) MULTIMODAL OBJECT IDENTIFICATION

(71) Applicant: GDM Holding LLC, Mountain View, CA (US)

(72) Inventors: Michael Joseph Quinlan, Sunnyvale, CA (US); Gabriel A. Cohen, Alameda, CA (US)

(73) Assignee: Google LLC, Mountain View, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 18/888,112

(22) Filed: Sep. 17, 2024

(65) Prior Publication Data

US 2025/0010482 A1 Jan. 9, 2025

Related U.S. Application Data

(63) Continuation of application No. 17/222,263, filed on Apr. 5, 2021, now Pat. No. 12,103,190, which is a (Continued)

(51) Int. Cl.

| | |
|---|---|
| ***B25J 9/16*** | (2006.01) |
| ***G05B 19/048*** | (2006.01) |
| *B25J 19/02* | (2006.01) |

(52) U.S. Cl.

CPC .......... *B25J 9/1697* (2013.01); *G05B 19/048* (2013.01); *B25J 19/026* (2013.01); *G05B 2219/23021* (2013.01)

(58) Field of Classification Search

USPC .................................................. 700/245–264

See application file for complete search history.

(56) References Cited

U.S. PATENT DOCUMENTS

| | | | | |
|---|---|---|---|---|
| 7,881,936 | B2 | 2/2011 | Longéet al. | |
| 8,140,188 | B2 * | 3/2012 | Takemitsu | B25J 9/1661 700/211 |

(Continued)

FOREIGN PATENT DOCUMENTS

| | | |
|---|---|---|
| CN | 104851211 A | 8/2015 |

OTHER PUBLICATIONS

Bajones et al., "Where to look first? Behavior control for fetch-and-carry missions of service robots," arXiv preprint arXiv1510.01554vl, Oct. 6, 2015, 6 pages.

(Continued)

*Primary Examiner* — Jonathan L Sample

(74) *Attorney, Agent, or Firm* — McDonnell Boehnen & Berghoff LLP

(57) ABSTRACT

Methods, systems, and apparatus for receiving a command for controlling a robot, the command referencing an object, receiving sensor data for a portion of an environment of the robot, identifying, from the sensor data, a gesture of a human that indicates a spatial region located outside of the portion of the environment described by the sensor data, searching map data for the object, determining, based at least on searching the map data for the object referenced in the command, that the object referenced in the command is present in the spatial region, and in response to determining that the object referenced in the command is present in the spatial region, controlling the robot to perform an action with respect to the object referenced in the command.

20 Claims, 4 Drawing Sheets

Related U.S. Application Data continuation of application No. 16/585,298, filed on Sep. 27, 2019, now Pat. No. 11,148,214, which is a continuation of application No. 15/643,138, filed on Jul. 6, 2017, now Pat. No. 10,427,306.

(56) References Cited

U.S. PATENT DOCUMENTS

| | | | | |
|---|---|---|---|---|
| 9,165,566 | B2 | 10/2015 | Klein et al. | |
| 9,427,863 | B2 | 8/2016 | Lee | |
| 9,751,212 | B1 * | 9/2017 | Martinson | G06N 3/008 |
| 10,427,306 | B1 * | 10/2019 | Quinlan | G06F 3/016 |
| 10,967,520 | B1 * | 4/2021 | Quinlan | B25J 9/1697 |
| 11,027,425 | B1 * | 6/2021 | Chao | G06F 3/017 |
| 12,103,190 | B1 * | 10/2024 | Quinlan | G06F 3/016 |
| 2007/0150099 | A1 * | 6/2007 | Lee | G06N 3/008 700/245 |
| 2007/0192910 | A1 * | 8/2007 | Vu | B25J 9/0003 901/1 |
| 2009/0132088 | A1 * | 5/2009 | Taitler | G05B 19/42 700/264 |
| 2011/0054691 | A1 | 3/2011 | Lee et al. | |
| 2011/0118877 | A1 * | 5/2011 | Hwang | B25J 13/00 901/50 |
| 2012/0173018 | A1 * | 7/2012 | Allen | B25J 11/008 700/245 |
| 2012/0185090 | A1 | 7/2012 | Sanchez et al. | |
| 2012/0197439 | A1 | 8/2012 | Wang et al. | |
| 2012/0316679 | A1 * | 12/2012 | Papaefstathiou | B25J 13/006 901/1 |
| 2013/0325244 | A1 | 12/2013 | Wang et al. | |
| 2015/0025681 | A1 | 1/2015 | Riek | |
| 2015/0032252 | A1 | 1/2015 | Galluzzo et al. | |
| 2015/0283702 | A1 * | 10/2015 | Izhikevich | B25J 9/163 700/257 |
| 2015/0362988 | A1 | 12/2015 | Yamamoto et al. | |
| 2015/0378444 | A1 | 12/2015 | Yin et al. | |
| 2016/0140963 | A1 | 5/2016 | Connell, II et al. | |
| 2016/0311115 | A1 * | 10/2016 | Hill | G02B 27/0172 |
| 2017/0173791 | A1 * | 6/2017 | Dalibard | B25J 9/1653 |
| 2017/0348854 | A1 * | 12/2017 | Oleynik | A47J 47/02 |
| 2018/0033276 | A1 * | 2/2018 | Whelan | G08B 21/02 |
| 2018/0192845 | A1 | 7/2018 | Gu et al. | |
| 2018/0231973 | A1 * | 8/2018 | Mattingly | G06F 3/012 |
| 2018/0333862 | A1 * | 11/2018 | Hayashi | A63H 3/40 |
| 2018/0348783 | A1 * | 12/2018 | Pitzer | A47L 9/2857 |

OTHER PUBLICATIONS

Boboc et al., "Point-and-Command Paradigm for Interaction with Assistive Robots," International Journal of Advanced Robotic Systems, 2015, 13 pages, vol. 12, No. 75.

Boboc et al., "Using body gestures and voice commands for assistive interaction," Recent Advances in Machines Mechatronics and Civil, Chemical and Industrial Engineering, INASE 2015, 8 pages.

Boucher et al., "I Reach Faster When I See You Look: Gaze Effect in Human-Human and Human-Robot Face-to-Face Cooperation," Frontiers in Neurorobotics, May 3, 2012, 11 pages, vol. 6.

Breuer et al., "Precise Pointing Target Recognition for Human-Robot Interaction," SIMP AR Workshop on Domestic Service Robots in the Real World, 2010, 12 pages, vol. 10.

Broz et al., "Gaze in HRI: from modeling to communication," Proceedings of the Seventh Annual ACM/IEEE International Conference on Human-Robot Interaction, Mar. 5-8, 2012, 2 pages.

Canal et al., "A Real-time Human-Robot Interaction system based on gestures for assistive scenarios," Computer Vision and Image Understanding, Aug. 31, 2016, 27 pages, vol. 149.

Chao et al., "A Developmental Approach to Robotic Pointing Bia Human-Robot Interaction," Information Sciences, Nov. 1, 2014, 16 pages, vol. 283.

Fransen et al., "Using Vision, Acoustics, and Natural Language for Disambiguation," Proceedings of the ACM/IEEE International Conference on Human-Robot Interaction, Mar. 10, 2007, 8 pages.

Kruijff et al., "Situated dialogue and understanding spatial organization: knowing what is where and what you can do there," The 15th IEEE International Symposium on Robot and Human Interactive Communication, Sep. 6-8, 2006, 6 pages.

Park et al., "Real-time 3D pointing gesture recognition for mobile robots with cascade HMM and particle filter," Image and Vision computing 23, 2011, 13 pages.

Pateraki et al., "Visual estimation of pointed targets for robot guidance via fusion of face pose and hand orientation," 2011 IEEE International Conference on Computer Vision Workshops, Nov. 6-13, 2011, 8 pages.

Prange et al., "Towards Gaze, Gesture and Speech-Based Human-Robot Interaction for Dementia Patients," Papers from the AAAI 2015 Fall Symposium on Artificial Intelligence for Human-Robot Interaction, 2015, 3 pages.

Richarz et al., "A Monocular Pointing Pose Estimator for Gestural Instruction of a Mobile Robot," International Journal of Advances Robotic Systems, Mar. 1, 2007, 12 pages, vol. 4, No. 1.

Schauerte et al., "Saliency-based Identification and Recognition of Pointed at Object," 2010 IEEE/RSJ International Conference on Intelligent Robots and Systems, Oct. 18-22, 2010, 6 pages.

Schermerhorn et al., "DIARC: A Testbed for Natural Human-Robot Interaction," Artificial Intelligence and Robotics Laboratory Department of Computer Science and Engineering, University of Notre Dame, 2006, 8 pages.

sciencesconf.org [ online] "Did you Mean this Object?: Detecting Ambiguity in Pointing Gesture Targets," Mar. 2, 2015, retrieved Jul. 7, 2017, retrieved from URL:https://fia.sciencesconf.org/57073/document, 8 pages.

Uxpamagazine.org [online], "Touchless Interaction: Communication with Speech and Gesture," 2014, retrieved on Jul. 7, 2017, retrieved from URL: http://uxpamagazine.org/touchless-interaction/, 5 pages.

Waldherr et al., "Template-Based Recognition of Pose and Motion Gestures on a Mobile Robot," AAAI/IAAI, Jul. 1998, 6 pages.

wikipedia.com [online], "Simultaneous localization and mapping," last Updated Jun. 21, 2017, retrieved on Jul. 7, 2017, retrieved from URL: https://en.wikipedia.org/wiki/Simultaneous localization and mapping, 8 pages.

www.dailymail.co.uk [online], "Now that's a useful gadget!," Dec. 2, 2014, retrieved on Jul. 7, 2017, retrieved from URL:http://www.dailymail.co.uk/sciencetech/article-2858324/Now-s-usefulgadget-Researchers-reveal-robot-clean-fold-dirtv-washing-does-cost-280-000.html, 4 pages.

www.wired.com [online], "Meet lorek, the robot that communicates in a remarkable way," Mar. 20, 2017, retrieved on Jul. 7, 2017, retrieved from URL:https://www.wired.com/2017/03/meetlorek-robot-communicates-remarkable-way/, 10 pages.

Zhao et al., "Building a grid-semantic map for the navigation of service robots through human-robot international," Digital Communications and Networks, Nov. 2015, 23 pages, vol. 1, No. 4.

* cited by examiner

MULTIMODAL OBJECT IDENTIFICATION

CROSS-REFERENCE TO RELATED APPLICATION

This application is a continuation application of U.S. application Ser. No. 17/222,263, filed Apr. 5, 2021, which is a continuation of application Ser. No. 16/585,289, filed Sep. 27, 2019, now U.S. Pat. No. 10,967,520, which is a continuation application of U.S. application Ser. No. 15/643,138, filed Jul. 6, 2017, now U.S. Pat. No. 10,427,306, all of which are incorporated by reference.

TECHNICAL FIELD

This specification relates to object identification, and one particular implementation relates to identifying objects based on human-robot interactions.

BACKGROUND

Human-computer interfaces that permit users to provide natural language or gestural inputs are becoming exceedingly pervasive. For example, a personal assistant application can receiving human speech and identify a command based on an analysis of that speech. The personal assistant application can perform or trigger operations in response to the identified command. Similarly, computer applications may receive images or video of a user and can detect human gestures from the images or video. The computer can interpret those gestures as commands and may perform or trigger operations responsive to the identified commands.

These techniques are also being applied in the field of robotics to enable human-robot interactions. For example, users may be able to provide gestures or speech inputs to a robot to command the robot to perform specific actions. In some examples, a user may refer to a particular object in a command, either by word or by gesture. In response to such a command, the robot may be required to identify a physical object in its environment that corresponds to the particular object referenced in the command. Challenges may arise where multiple objects in the robot's environment correspond to the particular object referenced in the command. In those instances, the robot may be required to disambiguate between the multiple objects, to identify a particular one of the multiple objects that the user likely intended to reference in their command.

SUMMARY

This application describes methods, systems, and computer programs for enabling a robotics system to disambiguate between multiple objects that may be out-of-view. The robotics system relies on both speech and image or video inputs to perform differentiation between the multiple objects.

In one implementation, when a user provides a spoken command to a robotics system, the robotics system analyzes the command to identify an object referenced by the command. The robotics system additionally accesses an inventory of a space in which the robotics system is programmed to operate, and searches the inventory for instances of the object referenced by the command. In many instances, the inventory will include multiple instances of the object within the space, for example, multiple cellphones, remotes, sets of keys, or pairs of reading glasses. To identify a particular one of those object instances, the robotics system evaluates one or more additional factors, including audio or video inputs.

For example, the robotics system can obtain image or video of the user near the time that the user gives the spoken command. The robotics system analyzes the image or video data to identify a gesture that the user provided near the time of the spoken command, and based on this gesture, identifies a particular region of the space in which the robotics system is programmed to operate. The robotics system may then limit a search of the inventory to the particular region. Doing so improves the accuracy of the robotics system's object-locating capabilities, by removing the possibility that the robotics system would locate a different instance of the object that is located in a different region of the space.

For example, a robotics system may determine that a spoken command references a cellular phone, and also determine that the user provided a gesture pointing towards a side of a house with a kitchen and dining room at the same time they provided the spoken command. Based on these determinations, the robotics system can search the inventory for a cellular phone within the kitchen or dining room of a house, but not search the inventory for a cellular phone within a bathroom or bedroom that are located on an opposite side of the house. Based on this search, the robotics system can locate a cellular phone that the user likely was referencing in their command, even though the cellular phone is out-of-view of the robotics system.

By narrowing the inventory search to objects within the region of the space that the user gestured towards, the robotics system will be more likely to identify the instance of the object that the user intended, e.g., the particular cellular phone in the dining room or kitchen, rather than identify another instance of the object, e.g., a cellular phone in the bathroom or bedroom. Thus, multimodal object identification that combines inputs of various types to perform identification of objects outside of the view of the robotics system can improve the accuracy of the robotics system's object-locating capabilities.

Innovative aspects of the subject matter described in this specification may be described in methods, systems, and non-transitory computer-readable storage devices storing software comprising instructions executable by one or more computers for performing actions including receiving a command for controlling a robot, the command referencing an object, receiving sensor data for a portion of an environment of the robot, the sensor data being captured by a sensor of the robot, identifying, from the sensor data, a gesture of a human that indicates a spatial region located outside of the portion of the environment described by the sensor data, in response to identifying the gesture, accessing map data indicating locations of objects within a space, the map data being generated before receiving the command, searching the map data for the object referenced in the command, wherein the search of the map data is restricted, based on the identified gesture, to the spatial region indicated by the gesture, determining, based at least on searching the map data for the object referenced in the command, that the object referenced in the command is present in the spatial region indicated by the gesture, and in response to determining that the object referenced in the command is present in the spatial region indicated by the gesture, controlling the robot to perform an action with respect to the object referenced in the command These and other embodiments may each optionally include one or more of the following features. In various examples, the identified gesture is one of an arm wave, a hand gesture, or a glance; receiving the command for controlling the robot, the command referencing the object comprises receiving audio data captured by a microphone of the robot that corresponds to the command, identifying, based on performing speech recognition on the audio data, one or more candidate objects that each correspond to a respective candidate transcription of at least a portion of the audio data, accessing an inventory of one or more objects within the space, and identifying the object from among the inventory of the one or more objects within the space based at least on comparing each candidate transcription of at least a portion of the audio data to the one or more objects of the inventory.

Embodiments may also each include one or more of the following optional features. In various examples, identifying the gesture of the human that indicates the spatial region located outside of the portion of the environment described by the sensor data comprises determining a location of the robot within the space, and determining the spatial region based at least on the gesture of the human and the location of the robot within the space; identifying the gesture of the human that indicates the spatial region located outside of the portion of the environment described by the sensor data comprises determining an orientation of the robot within the space when receiving the sensor data, and determining the spatial region based at least on the gesture of the human and the orientation of the robot within the space; identifying the gesture of the human that indicates the spatial region located outside of the portion of the environment described by the sensor data comprises detecting one or more predetermined shapes from the sensor data, each of the one or more predetermined shapes corresponding to a gesture of a human, determining one or more locations of the detected one or more predetermined shapes within the sensor data, and determining the spatial region based at least on the one or more predetermined shapes and the one or more locations of the detected one or more predetermined shapes within the sensor data.

Embodiments may also each optionally include one or more of the following optional features. In various examples, the features may optionally include receiving a second command for controlling the robot, the command referencing a second object, receiving second sensor data for a portion of the environment of the robot, the second sensor data being captured by the sensor of the robot, identifying, from the second sensor data, a second gesture of a human that indicates a second spatial region located outside of the portion of the environment described by the second sensor data, searching the map data for the second object referenced in the second command, wherein the search of the map data is restricted, based on the identified second gesture, to the second spatial region indicated by the second gesture, determining, based at least on searching the map data for the second object referenced in the second command, that the second object referenced in the second command is absent from the second spatial region indicated by the second gesture, based at least on determining that the second object referenced in the second command is absent from the second spatial region indicated by the second gesture, searching the map data for the second object referenced in the second command, wherein the search of the map is restricted to a third spatial region, determining, based at least on searching the map data for the second object referenced in the second command, that the second object referenced in the second command is present in the third spatial region, and in response to determining that the second object referenced in the second command is present in the third spatial region, controlling the robot to perform a second action with respect to the second object referenced in the second command; the third spatial region is larger than the second spatial region indicated by the second gesture.

Embodiments may also each optionally include one or more of the following optional features. In various examples, the features may optionally include receiving a second command for controlling the robot, the command referencing a second object, receiving second sensor data for a portion of the environment of the robot, the second sensor data being captured by the sensor of the robot, identifying, from the second sensor data, a second gesture of a human that indicates a second spatial region located outside of the portion of the environment described by the second sensor data, searching the map data for the second object referenced in the second command, wherein the search of the map data is restricted, based on the identified second gesture, to the second spatial region indicated by the second gesture, determining, based at least on searching the map data for the second object referenced in the second command, that the second object referenced in the second command is absent from the second spatial region indicated by the second gesture, and based at least on determining that the second object referenced in the second command is absent from the second spatial region indicated by the second gesture, controlling the robot to indicate that the second object referenced in the second command is absent from the second spatial region indicated by the second gesture.

Embodiments may also each optionally include one or more of the following optional features. In various examples, controlling the robot to perform the action with respect to the object referenced in the command comprises controlling the robot to perform one of retrieving the object referenced in the command, move the object referenced in the command to a predetermined location, move the object referenced in the command to a location indicated by the command, or navigate to the location of the object referenced in the command; the features may optionally include determining a location of the object referenced in the command within the spatial region, wherein the location of the object referenced in the command within the spatial region is represented by a set of coordinates within the space; the sensor data is one of image data, infrared image data, light detection and ranging (LIDAR) data, thermal image data, night vision image data, or motion data; the sensor data for the portion of the environment of the robot is image data for a field of view of a camera of the robot, the image data being captured by the camera of the robot.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1A:
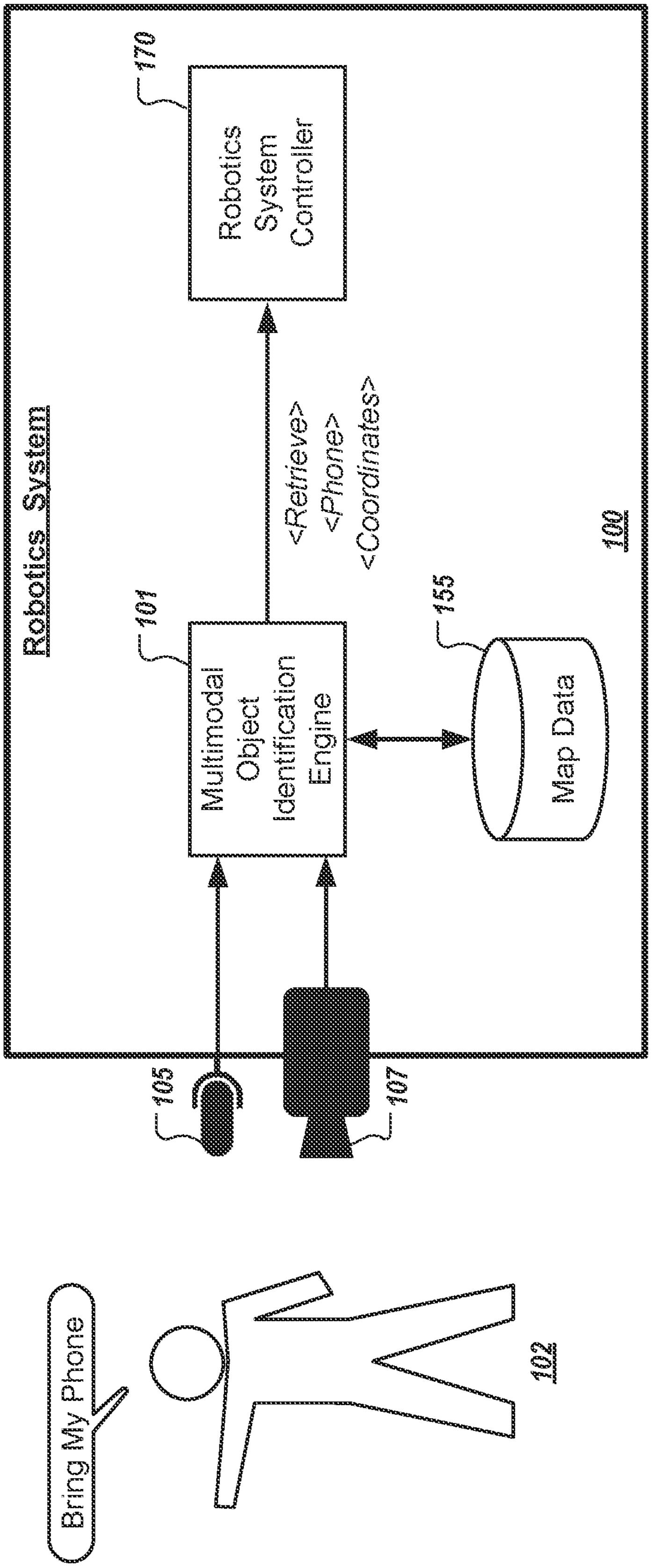
FIG. 1A depicts an example robotics system configured to perform multimodal object identification.

FIG. 1A depicts an example robotics system 100 configured to use multimodal object identification to improve its object-locating capabilities. To perform multimodal object identification, the robotics system 100 receives a spoken command provided by a user 102, and identifies an object referenced by the spoken command. The robotics system 100 also receives image or video of the user 102 providing the spoken command, and identifies from the image or video a gesture accompanying the spoken command. The gesture is used to limit a search for the object to a region within a space, where the robotics system 100 has knowledge of objects within the space. The robotics system's 100 knowledge is based on an inventory and mapping of objects within the space. When the robotics system 100 determines to narrow its search to a particular region of the space based on the detected gesture, it only searches the inventory and mapping for objects having locations within the particular region.

In doing so, the robotics system 100 can, for example, differentiate between two instances of an object in the space when only one of those instances has a location within the particular region. Thus, combining analyses of the spoken and gestural inputs improves the robotics system's 100 ability to differentiate between multiple objects within a space, and therefore, to demonstrate more accurate object-locating capabilities. After identifying an instance of an object using multimodal object identification, the robotics system 100 can retrieve the instance of the object from the particular region, or perform another action directed to the object, for example, move the object to a new location.

In greater detail, the robotics system 100 can include a microphone 105 and a camera 107. The microphone 105 can be any type of acceptable audio receiving device, for example, a carbon microphone, fiber optic microphone, dynamic microphone, electret microphone such as those commonly used in cellular phones or hands-free headsets, ribbon microphone, laser microphone, condenser microphone, cardioid microphone, crystal microphone, or other type of acceptable microphone. In some implementations, the microphone 105 can be replaced by another form of input device that the user 102 can use to provide commands to the robotics system. For example, the microphone 105 can be replaced by a keyboard, a touchscreen, or another input device capable of receiving commands, e.g., including one or more buttons, switches, knobs, keys, user-selectable icons, or other input devices. The camera 107 may be a still image or video camera, including either a film or digital still image or video camera. For example, the camera 107 may be a charge-coupled device (CCD) based digital camera or video camera, or a complementary metal-oxide-semiconductor (CMOS) based digital camera or video camera. In some implementations, the camera 107 may be replaced with another type of sensor device. For example, instead of the camera 107, the robotics system 100 may be equipped with an infrared or thermal sensor capable of generating infrared or thermal images, a light detection and ranging (LIDAR) system capable of generating LIDAR-derived images, a night vision imaging system, e.g., utilizing image intensification, active illumination, or thermal vision techniques, a motion sensor capable of detecting certain movements or of determining a location of movements within its detected region, or can include other sensor devices.

The microphone 105 and camera 107 can receive inputs from the user 102. For example, the user 102 may provide the spoken command "bring my phone" to the robotics system 100 while performing a gesture in which the user 102 points to their right. The microphone 105 can detect the spoken command and generate audio data corresponding to the spoken command. The camera 107 can obtain one or more images or video of the user 102 providing the gesture. The microphone 105 and camera 107 can provide the audio data and image or video data to the multimodal object identification engine 101.

The multimodal object identification engine 101 can receive the audio data corresponding to the spoken command and the image or video data, and can process the data to identify a particular instance of an object referenced by the user 102, as well as a command to perform with respect to the particular instance of the object. For example, the multimodal object identification engine 101 can generate a transcription of the spoken command "bring my phone," and can analyze the transcription to identify a command and an object. In the example shown in FIG. 1A, the multimodal object identification engine 101 can determine that the term "bring" in the spoken command indicates a retrieve command. The multimodal object identification engine 101 can further determine that the transcription references a "phone" object. In some instances, the space of which the robotics system 100 has knowledge can include multiple phones. For example, based on the multimodal object identification engine 101 determining that the transcription references a "phone," the multimodal object identification engine 101 can access map data 155 that includes object records. The object records can specify at least a description of each object known within the space, as well as a location of each known object within the space. The multimodal object identification engine 101 can search the object records in the map data 155 and determine that there are multiple instances of phones included in the map data. To perform the retrieve command with respect to the proper phone, the robotics system 100 can disambiguate between the multiple phones in the space.

The multimodal object identification engine 101 performs this disambiguation based on an analysis of the received image or video data. Specifically, the multimodal object identification engine 101 can analyze the image or video data, and based on that analysis, can identify a gesture performed by the user 102. In the example of FIG. 1A, the multimodal object identification engine 101 can determine that the user 102 is pointing to their right. The multimodal object identification engine 101 can determine, based on this gesture, that the user likely intended the robotics system 100 to retrieve a phone located to the right of the user 102. The multimodal object identification engine 101 can therefore limit a search of the map data 155 to only those object records in the map data 155 that indicate a location located to the right of user 102. For example, the multimodal object identification engine 101 may be able to determine a current location of the robotics system 100 within the space, and optionally an orientation of the robotics system 100 within the space. The orientation of the robotics system 100 may refer to a direction that the camera 107 of the robotics system 100 is facing. Based on the gesture and the location and/or orientation of the robotics system 100 within the space, the multimodal object identification engine 101 can search the map data 155 for instances of a phone within a particular region of the space, i.e., a region of the space that is located to one side of the robotics system's 100 current location.

Based on this search, the multimodal object identification engine 101 can identify a particular instance of a phone within the particular region of the space. The multimodal object identification engine 101 can further determine a precise location of the particular instance of the phone, for example, coordinates of the phone within the space. The multimodal object identification engine 101 can pass data indicating the retrieve command, data indicating that the object referenced by the command is a phone, and the coordinates of the phone within the space to a robotics system controller 170.

The robotics system controller 170 can receive the information from the multimodal object identification engine 101, and can generate instructions for controlling the robotics system 100 to retrieve the particular phone. For example, the robotics system controller 170 can generate instructions to navigate the robotics system 100 to the coordinates of the phone, to control the robotics system 100 to pick up the phone, e.g., using a mechanical claw or other mechanism of the robotics system 100, and to navigate the robotics system 100 back to its current location, thereby retrieving the phone as commanded by the user 102. The robotics system 100 can, in some implementations, be an ambulatory or otherwise mobile robot, and may include one or more legs, wheels, treads, tracks, casters, or other device for moving and controlling movement of the robotics system 100. The robotics system 100 can, in some implementations, include one or more different components for interacting with objects. For example, the robot may include one or more arms, claws, mechanical hands, suction cups, scoops, or other devices for interacting with objects. The robotics system controller 170 may be configured to control any of these components as needed to complete an action in response to a command received from the user 102.

Figure 1B:
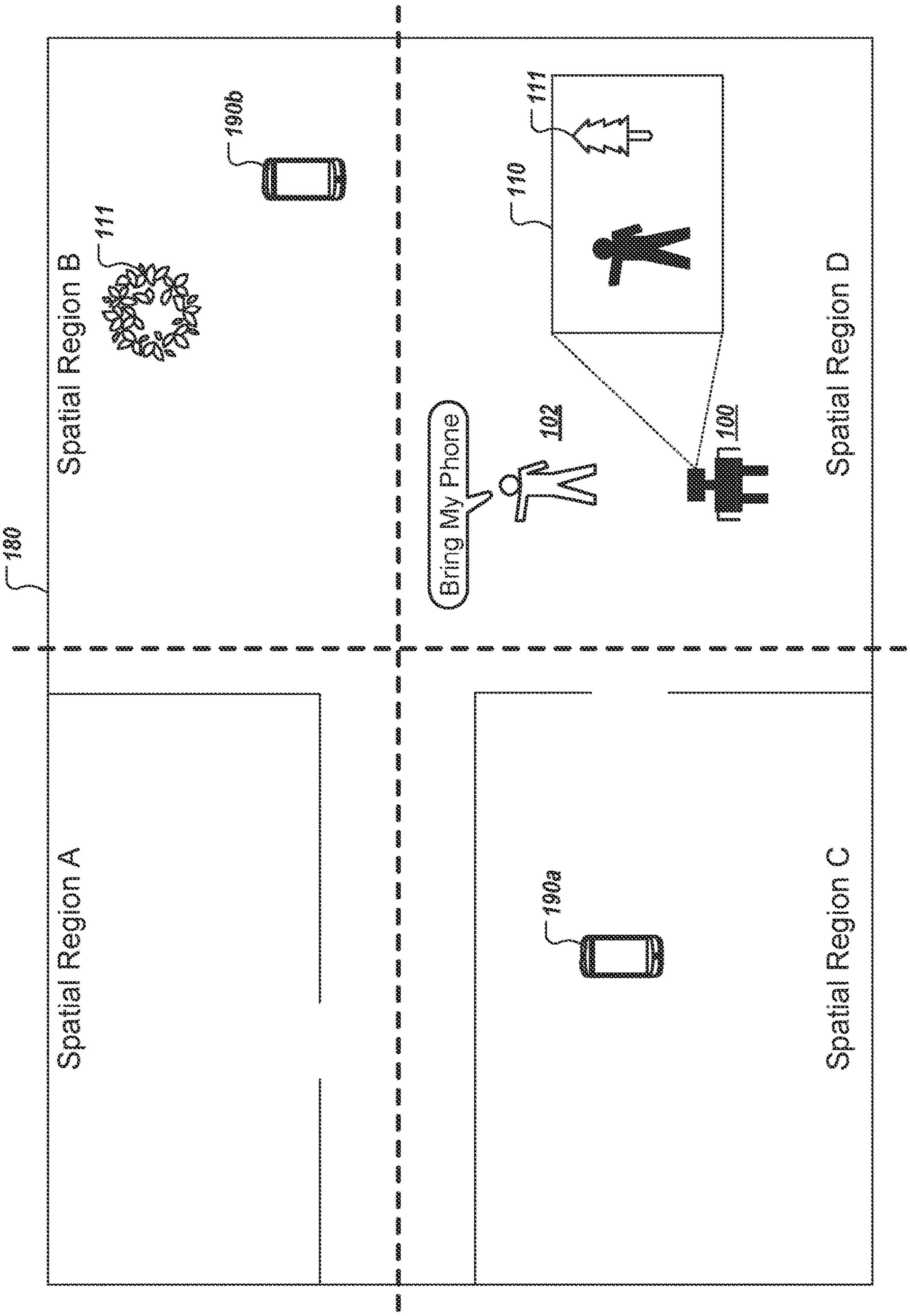
FIG. 1B depicts an example of multimodal object identification performed by a robotics system.

FIG. 1B depicts another example of multimodal object identification performed by the robotics system 100. As shown in FIG. 1B, the robotics system 100 and the user 102 are located in a space 180, for example, a home of the user 102. The space 180 may be associated with four regions A-D corresponding to quadrants of the space 180 that are defined for the robotics system 100 for purposes of performing multimodal object identification.

The spatial regions A-D shown in FIG. 1B are merely exemplary, and are optional. For example, the robotics system 100 may consider the space 180 to have more than four spatial regions, or may consider the space 180 to have fewer spatial regions. In some implementations, each defined room or space within the property can have an associated spatial region, e.g., each room or hallway within the space 180. In other implementations, the robotics system 100 may not recognize any spatial regions within the space 180. In such an implementation, the robotics system 100 may search for objects within the space 180 based on a location and/or orientation of the robotics system 100 in the space 180 and a direction indicated by a detected gesture.

Similar to the example of FIG. 1A, the robotics system 100 can detect the command "bring my phone" spoken by the user 102, and can capture an image or video 110 of the user 102 providing the spoken command. The robotics system 100 can analyze the command, e.g., by transcribing audio data corresponding to the spoken command, to determine that the spoken command references a "phone" object. The robotics system 100 also analyzes the image or video 110 that represents the field of view of the robotics system 100. For example, the image or video 110 can show the user 102 as well as other objects within the field of view of the robotics system 100, such as a house plant 111 located behind the user 102. Based on the analysis, the robotics system 100 can determine that the image or video includes the user 102 performing a pointing gesture to the right of the user 102.

Based on the gesture pointing to the right of the user 102, the robotics system can determine to limit a search for a phone to regions of the space 180 to the right of the user 102. Those regions may include spaces within the property 180 that are out-of-view of the robotics system 100, i.e., outside of the field of view shown in the image or video 110. For example, where the space 180 is divided into four spatial regions A-D as shown in FIG. 1B, the robotics system 100 can limit its search for a phone to regions to the right of the user 102, namely spatial regions A and C. Limiting its search for a phone to regions to the right of the user 102 means that the robotics system 100 will not search spatial regions B or D for a phone, because those spatial regions are not in a direction referenced by the gesture of the user 102.

The robotics system 100 can search spatial regions A and C for a "phone" object. For example, the robotics system 100 can access map data 155 as shown in FIG. 1A, and can identify a set of objects in the space 180 that are located in spatial regions A and C. The robotics system 100 can then search the set of objects for objects that are described as phones. Based on this search, the robotics system can identify the cellular phone 190*a*. By limiting the search to spatial regions A and C, the robotics system 100 can avoid an instance where the robotics system 100 would identify a different phone and incorrectly perform an action with respect to the different phone. For example, because the robotics system 100 limited its phone search to spatial regions A and C, the robotics system 100 would not incorrectly identify the cellular phone 190*b* located in spatial region B of the space 180, even though the cellular phone 190*b* may be more proximate to the robotics system 100 or within a field of view of the robotics system 100.

After identifying the cellular phone 190*a*, robotics system 100 can perform an action with respect to the cellular phone 190*a*. For example, the robotics system 100 may determine that the word "bring" in the command spoken by the user 102 corresponds to a retrieve command. Based on this determination, the robotics system 100 may navigate to the location of the cellular phone 190*a* in spatial region A of the space 180, pick up the cellular phone 190*a*, and return to its currently location in spatial region D.

Figure 2:
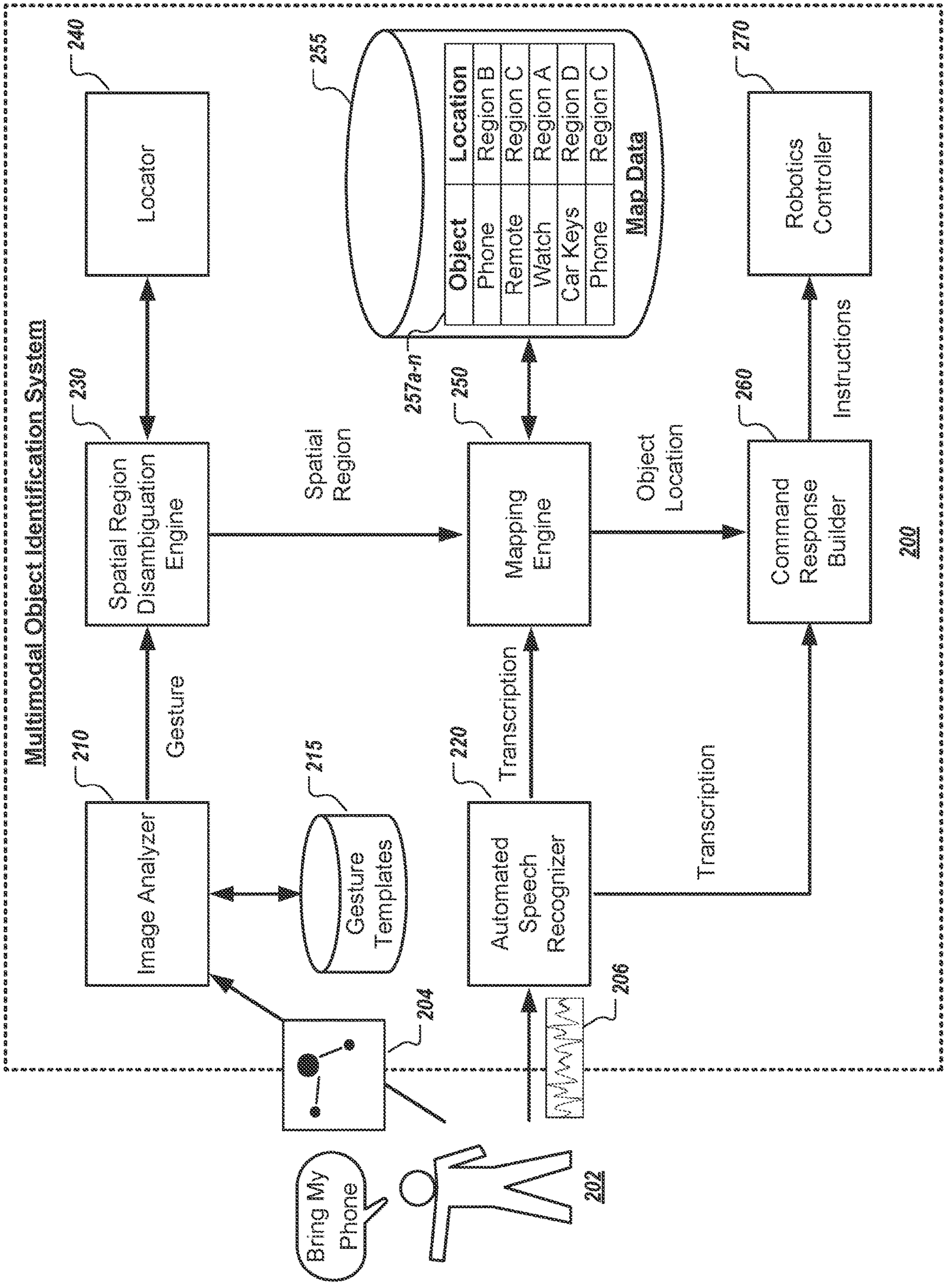
FIG. 2 depicts an example system configured to perform multimodal object identification.

FIG. 2 depicts an example system 200 configured to perform multimodal object identification. The example system 200 may be included in a robotics system, such as the robotics system 100 of FIGS. 1A and 1B.

Briefly, the system 200 includes an image analyzer 210, spatial region disambiguation engine 230, and locator 240 that collectively are capable of determining a region within a space. The image analyzer 210 can access gesture templates 215, for example, in one or more databases. The system 200 further includes an automated speech recognizer 220 that is configured to generate transcriptions of user inputs. The system 200 includes a mapping engine 250 in communication with map data 255 that may be stored, for example, in one or more databases. The automated speech recognizer 220 and mapping engine 250, and optionally the robot locator 240, are in communication with a command response builder 260 that transmits information to a robotics controller 270. Collectively, the components of the system 200 can process multiple inputs to identify an object referenced by a user-submitted command, and to perform actions with respect to the identified object. The components of the system 200 may be in communication over one or more wired or wireless connections, or over one or more networks.

In greater detail, when the user provides a spoken command to a robotics system that includes the system 200, audio data 206 corresponding to the spoken command is generated, e.g., by a microphone of the robotics system, and provided to the automated speech recognizer 220. The automated speech recognizer 220 receives the audio data 206, and generates a transcription of the spoken command based on the audio data 206. For instance, the user 202 can provide the voice command "bring my phone," and the automated speech recognizer 220 can receive audio data 206 corresponding to the voice command. The automated speech recognizer 220 can generate the transcription "bring my phone" from the audio data 206. While described predominantly as a spoken command, in some implementations the user 202 can provide a command to the robotics system using other means. For example, the user 202 may provide a textual command, can provide a command by selecting a button or user-selectable link, or may provide a command using a gesture, e.g., using American Sign Language (ASL) or using other gestures that associated with specific commands.

In addition to the audio data 206 including the spoken command, the system 200 can also receive sensor data, such as image or video data 204. The image or video data 204 may be obtained by a camera of the robotics system near a time when the user 202 provides the spoken command. For example, the robotics system can include a video camera that captures video corresponding to a field of view of the robotics system. At a time proximate to the user 202 providing the voice command, the video camera can capture video of the user 202 and provide the video data 204 to the image analyzer 210. For example, the user 202 may make a gesture while providing the spoken command "bring my phone" in which they point to their right. The robotics system can capture video of the user 202 pointing to the right, and can provide the image or video data 204 to the image analyzer 210.

The image analyzer 210 may identify gestures in the image or video data 204, and the system 200 can determine whether an identified gesture occurred within a threshold time of the command. The system 200 may use the gesture to determine how to carry out the command if the timing of the gesture matches the timing of the command, e.g., occurs within a predetermined threshold of the command. For example, the threshold may require the gesture to be concurrent the spoken command, or be made within 1 second before or after the command, or be made within 5 seconds before or after the command. Thus, if the identified gesture indicates a direction and is determined to coincide with or otherwise satisfy the timing threshold relative to the spoken command, then the system 200 can use the gesture to determine a region to focus on for carrying out the command.

In some instances, the image or video data 204 provided to the image analyzer 210 can be processed before it is provided to the image analyzer 210, for example, to determine shapes that are used in gesture analysis by the image analyzer 210. For example, as shown in FIG. 2, images or video of the user 202 may be processed and specific shapes, e.g., corresponding to a head, hands, and arms of the user 202, may be identified in the image or video data 204. The image or video data 204 provided to the image analyzer 210 may be processed image or video data that includes these detected shapes. Alternatively, unprocessed or unmodified image or video data 204 may be provided to the image analyzer 210. The image analyzer 210 can receive the image or video data 204 and can perform similar processing of the image or video data 204, e.g., to detect shapes in the image or video data 204 corresponding to a head, hands, and arms of the user 202.

The image analyzer 210 may perform a number of determinations from image or video data 204. For example, using the techniques discussed below, the image analyzer 210 may determine whether a gesture signals a direction or region of space. If it does, the image analyzer 210 may determine the direction of the gesture and type of gesture.

In some implementations, the image analyzer 210 determines a gesture of the user 202 based on analysis of the image or video data 204. To do so, the image analyzer 210 accesses a set of one or more gesture templates 215. The gesture templates 215 can include templates for gestures that are each associated with a specific meaning. For example, the gesture templates 215 may include a template for a gesture in which one arm of a user is down and another is extended outward to the side of the user, where the template may be identified as a pointing gesture indicating a direction. Another template may exist for a gesture in which both arms of a user are extended in front of the user, and may be identified as a pointing gesture indicating a direction in front of the user. A third template may exist for a gesture in which one arm of a user is bent and above a head of the user, and may be identified as a gesture indicating a direction behind the user. In some implementations, in addition to a shape detected in the image or video data 204, e.g., of an arm of a user, the image analyzer 210 may consider a location of the shape within the image or video data 204, i.e., within the field of view of the robotics system. For example, the image analyzer may determine that an extended arm of a user is on a right or left side of the field of view of the robotics system, and may use this information in determining the gesture of the user 202.

The gesture templates 215 may include other templates corresponding to other gestures, for example, a "stop" gesture interpreted as a command for the robotics system to stop moving, a "repeat" gesture interpreted as a command for the robotics system to repeat its last action, a "hush" gesture interpreted as a command for the robotics system to mute any audible outputs, etc. In some implementations, the gesture templates 215 can include templates for gestures involving arm waves or other arm movements by a user, hand gestures by a user, or glances by a user, such that the image analyzer 210 can detect any of such gestures from the image or video data 204 and interpret such gestures as having a particular meaning.

In some implementations, the gesture templates 215 may include templates that define more refined meanings of a more general gesture. For example, the gesture templates 215 may include not only a template for a gesture that indicates a direction, but also templates for gestures indicating a distance in addition to a direction. In the case of a gesture in which one arm of user is down and another is pointed outwards to indicate a direction, the gesture templates 215 may include multiple templates for varying degrees of an angle of the extended arm of the user. A template for a gesture in which one arm of a user is down and another arm of the user is extended at an angle that is substantially towards the floor may be identified as template for a gesture indicating a direction and further indicating a near distance, while a template for a gesture in which one arm of a user is down and another arm of the user is extended at an angle that is substantially parallel to the floor may be identified as a template for a gesture indicating a direction and further indicating a far distance.

In some implementations, a template may have an associated meaning that specifies one or more boundaries. For example, a template for a gesture in which one arm of a user is down and another is extended in a direction and at an angle substantially towards the floor may correspond to a gesture indicating a direction and a proximity within a same spatial region or room of a space. In contrast, a template for a gesture in which one arm of a user is down and another is extended in a direction and at an angle substantially parallel to the floor may correspond to a gesture indicating a direction and an unbounded proximity, or a proximity that extends to the entirety of a defined space, at least in the direction pointed.

The image analyzer 210 can compare the image or video data 204 or shapes detected from the image or video data 204 to the gesture templates 215, to identify a gesture of the user 202 from the image or video data 204. For example, based on comparing the preprocessed video data 204 shown in FIG. 2 to the gesture templates 215, the image analyzer 210 can determine that the video data 204 features the user 202 pointing to their right. In some implementations, determining that the video data 204 includes a gesture may include determining that the image or video data 204 includes shapes or other features that substantially match one of the gesture templates 215, that the image or video data 204 includes shapes or other features that are determined to match one of the gesture templates 215 substantially more than others of the gesture templates 215, e.g., based on scores that are determined by the image analyzer 210 and that reflect a degree of matching or confidence of the matching between the image or video data 204 and a particular gesture template 215, or based on other methods. Having identified the gesture from the image or video data 204, the image analyzer can provide the data indicating the gesture to the spatial region disambiguation engine 230.

The spatial region disambiguation engine 230 can receive the information indicating the gesture of the user 202, and can determine a region of the space based at least in part on the gesture. For example, as described with respect to FIG. 1B, the space in which the robotics system is located may be divided into one or more spatial regions that correspond to physical regions within the space. The spatial region disambiguation engine 230 can receive the information indicating the gesture, and based on the gesture, can determine a region of the space, where the region of the space generally includes areas that are not within the field of view of the robotics system. For example, based on receiving the information indicating that the user 202 pointed to their right, the system can determine a region of the space that corresponds to the direction of the point of the user 202, even though much of that region is out of the field of view of the robotics system.

Where the space is divided into multiple predefined regions, such as the spatial regions A-D of FIG. 1B, the spatial region disambiguation engine 230 can identify one or more of the spatial regions. In the example of FIG. 1B, for instance, based on the user 202 pointing to their right, the spatial region disambiguation engine 230 can select spatial regions A and C, since those regions are in the direction pointed by the user 202. Alternatively, if the space is not divided into multiple predefined regions, the spatial region disambiguation engine 230 may define a region of the space based on the gesture. For example, based on identifying the gesture of the user 202 pointing to their right, the spatial region disambiguation engine 230 can define the side of the property indicated by the user's 202 pointing as a region. Having identified a region of the space, the spatial region disambiguation engine 230 can provide the mapping engine 250 with information indicating the spatial region.

In some implementations, the spatial region disambiguation engine 230 may also receive the image or video data 204 and may analyze the image or video data 204 to determine the spatial region. For example, the spatial region disambiguation engine 230 may receive the image or video data 204 and may analyze the image or video data 204 to identify objects or landmarks in a field of view of the robotics system. The spatial region disambiguation engine 230 may use identified objects or landmarks in the field of view of the robotics system to determine a location of the robotics system 230 and/or an orientation of the robotics system in the space. The spatial region disambiguation engine 230 may use the determined location and/or orientation of the robotics system in the space to identify the spatial region.

In the example shown in FIG. 1B, for instance, the image or video 110 includes the house plant 111 in the right side of the frame. The system 200 may be aware of the location of the house plant 111 within the space, for example, if the house plant 111 is included as an object in the map data 255. Therefore, the spatial region disambiguation engine 230 may access the map data 255 to determine a location of the house plant 111, and based on the location of the house plant 111 detected in the image or video 110 and the location of the house plant 111 within the space determined from the map data 255, the spatial region disambiguation engine 230 can determine a location and/or orientation of the robotics system within the space. This process may be enhanced where the spatial region disambiguation engine 230 can identify multiple objects within the visual information, e.g., the image or video data 204. The spatial region disambiguation engine 230 can use the determined location and/or orientation of the robotics system to determine the spatial region.

In some implementations, the spatial region disambiguation engine 230 may rely on information from the locator 240 to determine the spatial region. The locator 240 may determine and/or provide information indicating a location and/or orientation of the robotics system that includes the system 200. For example, the locator may utilize global positioning system (GPS) technology, wireless location beacon technology, Wi-Fi positioning (WPS) technology, multilateration based on radio, cellular, or other signals, or other techniques to determine a location of the robotics system within the space. The location of the robotics system within the space may be defined using, e.g., latitude and longitude coordinates, or using coordinates that are specific to the space, e.g., coordinates similar to x-y axis coordinates within the space. The locator 240 may further determine an orientation of the robotics system within the space. For example, the locator 240 may include a compass for determining a direction that the camera of the robotics system is facing, or may be able to otherwise determine an orientation of the robotics system, for example, based on an analysis of the image or video data 204 as discussed above. The determined location and/or orientation of the robotics system within the space may enables the spatial region disambiguation engine 230 to more accurately determine a spatial region in the space referenced by the gesture of the user 202.

The spatial region disambiguation engine 230 may utilize the gesture information received from the image analyzer 210 and the location and/or orientation information received from the locator 240 to determine a spatial region. Returning to the example of FIG. 1B, for instance, the spatial region disambiguation engine 230 can receive information indicating that the user 202 is pointing to their right, and can also receiving information indicating that the robotics system is located in spatial region D of the space. Based on this information, the spatial region disambiguation engine 230 may, for example, identify spatial region C, since it is to the right of the user 202 when the user 202 and robotics system are located in spatial region D at their current orientations, but may not identify spatial region A, since that region is somewhat behind the user 202 and the robotics system when they are located in spatial region D at their current orientations.

Similarly, the orientation information may be used by the spatial region disambiguation engine 230 to resolve a direction referred to be a gesture of the user 230. Without this information, it may be difficult for the spatial region disambiguation engine 230 to determine if the user 202 is, for example, pointing towards the spatial region C or towards another spatial region within the space, e.g., spatial region B. Thus, information indicating a location and/or orientation of the robotics system may be used by the spatial region disambiguation engine 230 to identify a specific spatial region referred to by a user's gesture.

The mapping engine 250 receives the transcription generated by the automated speech recognizer 220 and the information indicating the spatial region from the spatial region disambiguation engine 230. Based on this information, the mapping engine 250 identifies the object referenced in the command submitted by the user 202. The mapping engine 250 can identify the object by accessing and searching map data 255 that stores object records 257*a-n*.

Each of the object records 257*a-n* in the map data 255 correspond to a single object within the space. Each object record 257*a-n* specifies a description of the object, e.g., that the object is a phone, remote, watch, set of car keys, pair of reading glasses, coffee mug, etc. Each object record 257*a-n* also indicates a location of the object within the space. For example, the location of the object may be indicated by a region where the object is located within the space, may be indicated by coordinates, e.g., GPS coordinates or other coordinates within the space, may be indicated by a room of the space where the object is located, e.g., that the object is located in a kitchen, dining room, bathroom, etc., or may be otherwise indicated so that the robotics system can locate the object in the space.

In some implementations, the map data is determined before the user 202 submits their command. For example, the robotics system may update the map data 255 as the robotics system determines that an object has been moved in the space, introduced to the space, or removed from the space. As the robotics system moves through the space, the robotics system may detect objects, e.g., using its camera, and log or update their locations in the map data 255. Alternatively, the robotics system may periodically update the map data 255, e.g., to reflect observations made by the robotics system that objects have been introduced, moved, or removed from the space. Other methods of maintaining and updating the map data 255 may be employed. While the map data 255 is shown in FIG. 2 as being stored in a database in tabular form, in other implementations, the map data 255 may be stored in other forms. For example, the object records 257*a-n* may be stored as a linked list, hash table, in a relational database, or in another form. While the object records 257*a-n* are shown in FIG. 2 as only specifying an object description and a location of the object within the space, in other implementations, additional information may be indicated in the object records 257*a-n*. For example, the object records 257*a-n* may specify characteristics of the objects, a last time each of the objects' location was updated or the object was "seen" by the robotics system, a description or image of the objects, e.g., their colors, shapes, or sizes, indications of owners of the objects that is used to disambiguate between objects when an identity of the user 202 is known or is determined by the robotics system, or other information.

To identify the object based on the transcription and the information indicating the spatial region, the mapping engine 250 can identify an object from the transcription. For example, the mapping engine may have a vocabulary of terms that correspond to objects, e.g., nouns. The vocabulary of terms may include terms that are not represented in the map data 255. For example, the vocabulary may include the term "mop," even if the map data 255 does not include any object records 257*a-n* for a "mop." In other implementations, the vocabulary of terms that the mapping engine 250 can recognize as an object may be limited to those terms used to describe objects identified in the map data 255. For example, if the map data does not include an object record 257*a-n* for a "mop," the mapping engine 250 might not be able to identify an object referenced by the command input by the user 202.

The mapping engine 250 can identify an object referenced by the command by comparing one or more terms of the transcription to the vocabulary of terms known to the mapping engine 250. If the mapping engine 250 determines that a term of the transcription is included in the vocabulary, the mapping engine 250 can identify that object as being referenced by the command. For example, the mapping engine 250 can compare the terms of the command "bring my phone" to a vocabulary of terms, and determine that the term "phone" is included in the vocabulary. Based on this determination, the mapping engine can identify a phone as the object referenced by the command input by the user 202.

Alternatively, if a transcription of the command does not include a term referencing an object, e.g., either does not include a term in the vocabulary of nouns or does not include a term of an object record 257*a-n*, depending upon the implementation, the mapping engine 250 may cause the robotics system to provide an output to the user 202 indicating that the robotics system has not identified any objects referenced by their command. Providing such an output may prompt the user 202 to repeat their command, to use different terms in their command, or to provide a different command to the robotics system.

In some implementations, the automated speech recognizer 220 generates multiple transcriptions of the spoken command of the user 202, and can provide each of the candidate transcriptions to the mapping engine 250. The mapping engine 250 can identify multiple candidate objects referenced by the command, based on the multiple transcriptions of the command. For example, the command "bring my phone" may also be transcribed as "bring a scone," and the mapping engine may compare each of the candidate objects "phone" and "scone" to objects in the map data 255 to determine whether the object referenced in the command is likely "phone" or "scone." Based on the mapping engine 250 identifying a "phone" object in the map data 255 but not a "scone" object, the mapping engine 250 can identify the object referenced by the command as a phone.

Having determined the object referenced by the command and received the information indicating the spatial region, the mapping engine 250 can search the map data 255 for the object referenced by the command. The search conducted by the mapping engine 250 is limited to the spatial region. For example, the mapping engine 250 may receive information indicating that a search of the space is limited to spatial regions A and C, as discussed with respect to FIG. 1B. Based on this information, the mapping engine 250 can identify a set of object records 257*a-n* in the map data 255 that have locations in either spatial region A or spatial region C of the property. Other object records 257*a-n* having locations in either spatial regions B or D, or other locations, are excluded from the set by the mapping engine 250. The mapping engine 250 may then search the set of object records 257*a-n* for objects that are described as a phone. Based on this search, the mapping engine 250 can identify a particular object as the object referenced by the command submitted by the user 202.

For example, the mapping engine 250 may determine that the transcription "bring my phone" references a "phone" object, and may further receive information specifying spatial regions A and C. Based on the information specifying spatial regions A and C, the mapping engine 250 may identify object records 257*a-n* having locations in either spatial region A or C. Thus, the mapping engine 250 may identify the object records 257*a-n* associated with the remote located in spatial region C, the watch located in spatial region A, and the phone located in spatial region C. The mapping engine 250 can search this subset of the object records 257*a-n*, and determine that the subset of object records 257*a-n* includes a record for a phone located in spatial region C. The mapping engine 250 may therefore identify the record for the phone located in spatial region C as being the object likely referenced by the user 202 in their command.

In another implementation, the mapping engine 250 may search the map data 255 by searching for all instances of the object referenced in the command that appear in the map data 255. For example, based on determining that the command submitted by the user 202 references a "phone" object, the mapping engine 250 can access the map data 255 and identify all object records 257*a-n* that describe a phone. The mapping engine 250 may then limit its search to only the spatial regions indicated in the information received from the spatial region disambiguation engine 230, by searching among the object records 257*a-n* that reference a phone for objects located in, for example, spatial regions A or C. Based on this search, the mapping engine 250 can determine that the subset of object records 257*a-n* for "phone" objects includes a record for a phone located in spatial region C. The mapping engine 250 can therefore identify this record as the particular object likely referenced by the user 202 in their command.

In some instances, the mapping engine 250 may do a search of the map data 255 that is restricted to a spatial region indicated by the data received from the spatial region disambiguation engine 230, but may fail to identify any object records 257*a-n* for the object referenced by the command in that spatial region. Based on this determination, the mapping engine 250 may determine to alter the spatial region and perform an additional search of the map data 255. For example, the mapping engine 250 may determine to expand the spatial region within the space, or to select a different spatial region within the space. The mapping engine 250 may conduct an additional search of the map data 255 that is limited to the altered spatial region. If the mapping engine 250 identifies the object referenced by the command based on the search of the altered spatial region, the mapping engine 250 can select the object identified in the altered spatial region as the object the user 202 likely intended to reference in their command.

For example, if the mapping engine 250 searches for a phone in the spatial regions A and C of the space 180 of FIG. 1B and fails to find a "phone" object in those spatial regions, the mapping engine 250 can expand the search of the space 180 to search all of spatial regions A, B, C, and D for a phone. Alternatively, in response to determining that a "phone" object is not located in spatial regions A or C of the space 180, the mapping engine 250 may alter its search to instead search in spatial region B of the space 180 for a phone. If the mapping engine 250 identifies a phone based on this altered search, for example, by identifying the phone 190*b* of FIG. 1B, the mapping engine 250 may identify the phone 190*b* as the object likely referenced by the user 202 in their command "bring my phone." Such an implementation may address a scenario where, for example, the user 202 has forgotten where they put their phone and so have incorrectly directed the robotics system with their gesture.

In some implementations, the mapping engine 250 may conduct a search of a spatial region or altered spatial region of a space, and may fail to identify an object referenced by the command within the searched spatial region. In response to the mapping engine 250 failing to identify an object referenced by the command, the mapping engine 250 may cause the robotics system to output data indicating that the robotics system has failed to identify an object referenced by the command. For example, the mapping engine 250 may cause the robotics system to output an error alert, e.g., a textual or audible message, indicating that the robotics system has failed to identify an object referenced by the command. The error alert may prompt the user 202 to provide their command again, or to provide a different command.

Based on the mapping engine 250 identifying an object likely referenced by the user 202 in their command in the searched spatial region, the mapping engine 250 can determine a location of the object within the space, and can provide information indicating the location of that object to the command response builder 260. For example, based on identifying an object in the map data 255 that the user 202 likely intended to reference in their command, the mapping engine 250 can access the object record 257*a-n* for that object to obtain information specifying the location of that object, such as information indicating a spatial region where that object is located or coordinates of that object within the space. The mapping engine 250 can provide the information indicating the object likely referenced by the user 202 in their command and the location of that object to the command response builder 260.

The command response builder 260 can receive the information specifying the identified object referenced in the command, as well as the location of that object from the mapping engine 250. The command response builder 260 can further receive the transcription of the command of the user 202 from the automated speech recognizer 220. Based on this information, the command response builder 260 can determine an action for the robotics system to perform. In some implementations, the command response builder 260 can also receive information from the locator 240 or the spatial region disambiguation engine 230 indicating the location of the robotics system within the space and/or an orientation of the robotics system in the space.

For example, the command response builder 260 can analyze the transcription of the command and can determine an action to perform based on one or more terms of the transcription. In the example depicted at FIG. 2, for instance, the command response builder 260 can receive the transcription "bring my phone" and determine that the term "bring" corresponds to an action to retrieve an object referenced by the command. To determine the action based on the transcription, the command response builder 260 can include a vocabulary of terms and corresponding actions for those terms.

The actions may include actions to move an object referenced by a command to one or more other locations. For example, the terms "bring," "retrieve," "get," or "hand me" may each refer to a retrieve operation that requires the robotics system to navigate to a location of an object referenced by the command, pick up the object, and then return to a current location of the robotics system with the object. The terms "throw away," "trash," or "recycle" may correspond to a command requiring the robotics system to navigate to a location of an object referenced by the command, pick up the object, navigate to a location of a trash can or recycling bin within the space, and drop the object into the trash can or recycling bin at that location. Other actions may be available to the command response builder 260. For example, the vocabulary may include one or more terms that, when detected by the command response builder 260, cause the command response builder 260 to generate instructions for controlling the robotics system to put an object referenced by the command in a particular storage place, take an object referenced by the command outside, navigate to a location of the object without doing more, etc. The command response builder 260 may also be capable of identifying actions from commands that do not reference a particular object within a space, such as commands to open a door, vacuum a floor, play a song, or perform any number of other operations.

In some examples, the command response builder 260 may receive multiple transcriptions of the command submitted by the user 202, and may determine multiple candidate actions to perform based on those transcriptions. For example, the command response builder 260 may receive multiple transcriptions of the command "bring my phone" that include the terms "bring," "ping," and "sling." The command response builder 260 can determine one or more candidate actions for each of these transcriptions. For example, the command response builder 260 may determine that "bring" can refer to either an action to retrieve an object, or an action to bring an object to another person in the space, may determine that "ping" refers to an action to place a phone call to a particular person, and may determine that "sling" refers to an action to throw an object. To identify a particular action for the robotics system to perform, the command response builder 260 may evaluate each candidate action, for example, by determining a confidence score for each action. The command response builder 260 can identify a particular action for the robotics system to perform based on the confidence scores for each action, e.g., by selecting a candidate action with the highest confidence score as the action for the robotics system to perform.

Based on determining an action to perform with respect to the object referenced by the command, the command response builder 260 generates instructions for controlling the robotics system to perform the action. For the example shown in FIG. 2, the command response builder 260 may generate instructions to control the robotics system to navigate to the location of the phone identified by the mapping engine 250, to pick up the phone, and to return the phone to a current location of the robotics system. In some implementations, generating instructions to control the robotics system may require that the command response builder 260 access information indicating a location and/or orientation of the robotics system. For instance, to generate instructions for navigating the robotics system to the location of the phone identified by the mapping engine 250, the command response builder 260 may require information indicating a current location of the robotics system.

The command response builder 260 can generate the instructions for controlling the robotics system to perform the action, and can provide the instructions to the robotics controller 270 to cause the robotics system to perform the action. For example, the instructions may be received by the robotics controller 270 and executed by the robotics controller 270 to control one or more components of the robotics system to navigate to the location of the phone identified by the mapping engine 250, to pick up the phone, and to return to the current location of the robotics system with the phone.

Figure 3:
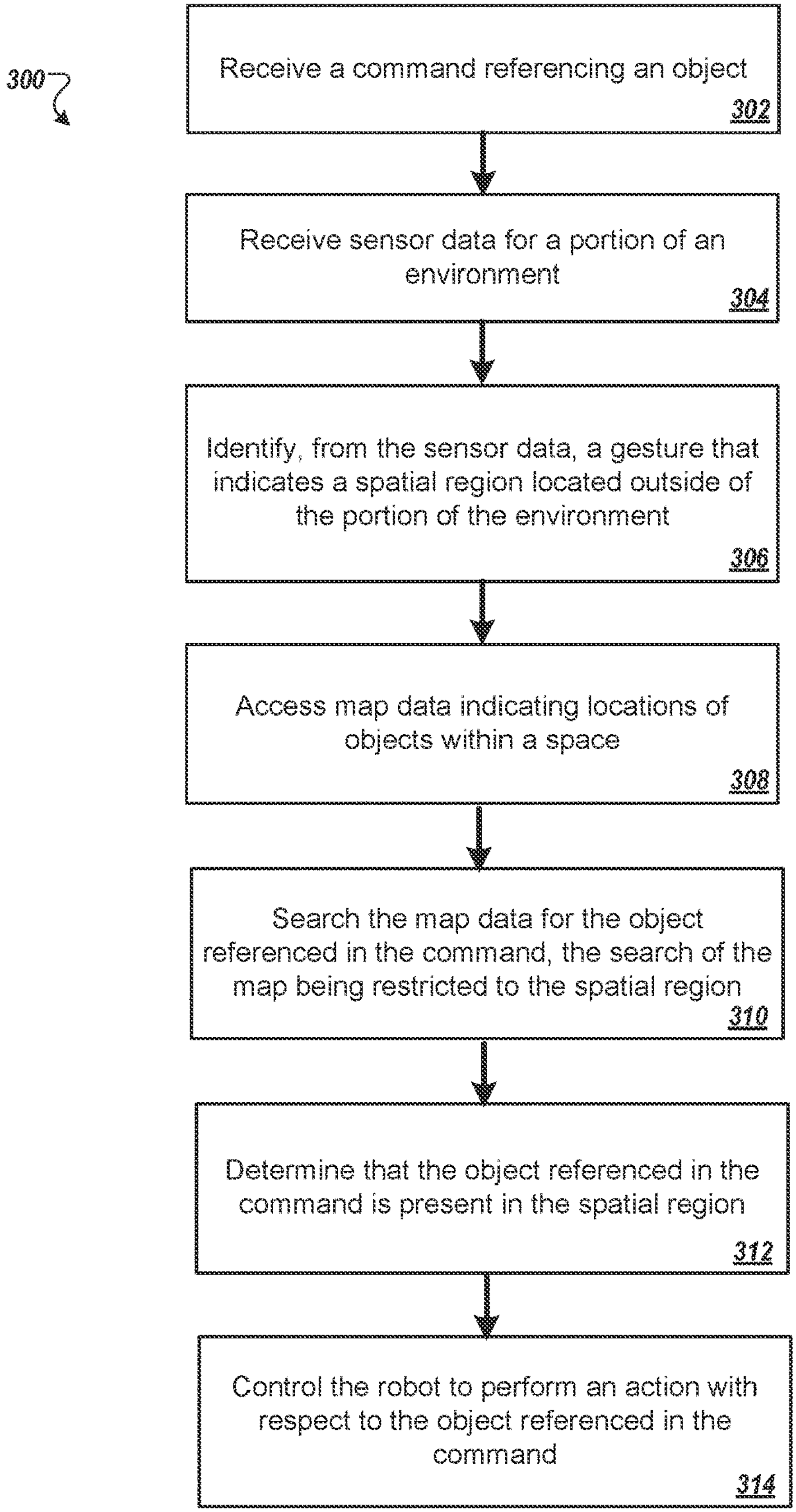
FIG. 3 depicts an example process for performing multimodal object identification.

FIG. 3 depicts an example process 300 for performing multimodal object identification. In some implementations, the process 300 is performed by a robot system, for example, the robotics system 200 of FIG. 2. The example process 300 can be used by the robotics system to identify an object located outside of a field of view of the robotics system.

A system receives a command for controlling the robotics system, wherein the command references an object (302). For example, the system can receive audio data corresponding to a spoken input of a user, and can perform speech recognition on the audio data to generate a transcription of the spoken command. The system can identify one or more terms of the spoken command that reference an object.

For example, the robotics system 200 may include a microphone that receives audio data 206 corresponding to a spoken input by the user 202. The automated speech recognizer 220 of the robotics system 200 can receive the audio data 206 and perform speech recognition on the audio data 206 to generate a transcription of the spoken command. The automated speech recognizer 220 can provide the transcription to the mapping engine 250, which can compare terms of the transcription to object descriptions stored map data 255. Based on the comparison, the mapping engine 250 can identify an object referenced in the command, e.g., an object descriptor in the map data 255 that corresponds to one or more terms of the transcription.

The system receives sensor data for a portion of an environment of the system, the sensor data being captured by a sensor of the system (304). The sensor data may include, for example, images or video of a user providing the spoken command. For example, the robotics system 200 of FIG. 2 can receive images or video captured by a camera of the robotics system 200. The image data can includes images or video of the user 202 who provided the spoken command. Image or video data 204 corresponding to the images or video may be received by, for example, the image analyzer 210 of the robotics system 200. In other implementations, the sensor data may be other sensor data for a portion of the environment of the robotics system 200. For example, the sensor data may be image or video data generated by a night video, infrared imaging, or thermal imaging camera, a LIDAR-derived image, motion sensor data, or other sensor data that indicates characteristics of a portion of the environment of the robotics system 200.

The system identifies, from the sensor data, a gesture of a human that indicates a spatial region located outside of the portion of the environment described by the sensor data (306). For example, the system may analyze image or video data obtained by a camera of the system to identify a gesture made by the user who provided the command. The system can interpret the gesture made by the user as indicating a spatial region that is not visible in the received images or video themselves. In some instances, the spatial region indicated by the gesture can be determined based in part on a location and orientation of the system when it received the command.

For example, the image analyzer 210 of the robotics system 200 can analyze the received image or video data 204 and identify a gesture of the user 202 in the image or video data 204. The image analyzer 210 can compare the identified gesture to the gesture templates 215. Based on the comparison, the image analyzer 210 can determine that the gesture indicates a spatial region that is not itself visible in the images or video of the image or video data 204. In some implementations, to identify the spatial region, the gesture is provided to a spatial region disambiguation engine 230 of the robotics system 200. The spatial region disambiguation engine 230 can also determine a location and/or orientation of the robotics system 200. The spatial region disambiguation engine 230 can identify the spatial region based on the gesture and the location and/or orientation of the robotics system 200. In other implementations, the robotics system 200 may receive other sensor data, such as data derived by infrared, thermal, night vision, LIDAR, or motion detection sensors or systems, and may identify a gesture based on comparing characteristics determined from the sensor data, e.g., shapes or types of movements, to templates, e.g., stored in gesture templates 215.

In response to identifying the gesture, the system accesses map data indicating locations of objects within a space, wherein the map data is generated before receiving the command (308). For example, the system may maintain map data that indicates the locations of numerous objects within a space. The locations of the objects may be updated over time as objects are introduced or removed from the space, or moved within the space. Thus, the map data may be a running record of the locations of various objects within the space.

For example, in response to identifying the gesture indicating the spatial region that is not represented in the image or video data 204 received by robotics system 200, the mapping engine 250 accesses map data 255. The map data 255 may store the locations of objects within a space in which the robotics system 200 is located. The map data 255 may be updated over time, for example, as objects are moved into the space, out of the space, or within the space. Therefore, the map data 255 accessed by the mapping engine 250 is generated before the command was received from the user 202.

The system searches the map data for the object referenced in the command, wherein the search of the map data is restricted, based on the identified gesture, to the spatial region indicated by the gesture (310). For instance, the map data accessed by the system may be searchable by the system. The system may limit its search of the map data to locations within the spatial region that were identified based on the gesture, for example, by identifying all object locations that are within the spatial region. The system can search the objects within the spatial region for the object referenced in the user's spoken command.

For example, the mapping engine 250 may receive information identifying the spatial region from the spatial region disambiguation engine 230. Based on this information, the mapping engine 250 can identify object records in the map data 255 that have locations within the spatial region. For instance, each object in the space may be represented in the map data 255 as a record having an associated location, e.g., represented as coordinates within the space. The mapping engine 250 can receive the information indicating the spatial region, and may determine coordinates within the space that define the spatial region. Object records 257*a-n* with locations that are within the coordinates of the spatial region can be identified by the mapping engine 250 as the object records 257*a-n* to search for the object. The mapping engine 250 may search the object records with coordinate locations within the coordinates of the spatial region for the object referenced in the audio data 206.

Based at least on the searching the map data for the object referenced in the command, the system can determine that the object referenced in the command is present in the spatial region indicated by the gesture (312). For example, the system can determine that the object is included among the objects having locations within the spatial region, based on searching the objects having locations within the spatial region for the object referenced by the command.

Referring to the robotics system 200 of FIG. 2, the mapping engine 250 may compare the object, e.g., one or more terms identifying the object referenced by the command, to object descriptions associated with the object records 257*a-n* having coordinate locations within the coordinates of the spatial region. Based on the comparison, the mapping engine 250 can determine that a particular object record 257*a-n* having a coordinate location within the coordinates of the spatial region has an object description that matches the one or more terms that identify the object.

In response to determining that the object referenced in the command is present in the spatial region indicated by the gesture, the system controls the robot to perform an action with respect to the object referenced in the command (314). For example, in addition to identifying an object referenced by the command, the system can also determine an action referenced by the command. In addition to determining that the object referenced in the command is present in the spatial region, the system can determine a precise location of the object within the spatial region. Based on this information, the system can determine instructions for controlling the robotics system to perform an action with respect to the object referenced in the command. For example, the system can determine instructions for controlling the robotics system to navigate to the location of the object from its current location, or to perform other actions with respect to the object referenced in the command. The system can use these instructions to control the robotics system to perform the navigation or other actions.

For example, in addition to determining that the object referenced in the audio data 206 is associated with an object record that has a coordinate location within the coordinates of the spatial region, the mapping engine 250 can also provide that coordinate location to the command response builder 260. The command response builder 260 can receive the information indicating the coordinate location of the object referenced in the audio data 206. Additionally, the command response builder 260 can analyze the transcription of the audio data 206 to identify an action referenced in the command. The command response builder 260 can use the information indicating the location of the object within the spatial region and the action, and optionally information indicating a current location or orientation of the robotics system 200, to generate instructions for controlling the robotics system 200 to perform the action with respect to the object.

For example, the command response builder 260 can determine instructions for controlling the robotics system 200 to navigate to the coordinate location of the object referenced in the audio data 206. The command response builder 260 may furthermore determine instructions for controlling the robotics system 200 to perform the identified action with respect to the object. For example, the command response builder 260 may generate instructions for controlling the robotics system 200 to pick up the object and to navigate the robotics system 200 back to its current location, i.e., to perform a retrieve action. The command builder 260 can provide the generated instructions to the robotics controller 270. The robotics controller 270 can receive the instructions, and can execute the instructions to control the robotics system 200 to perform the action with respect to the object referenced in the audio data 206. For example, the robotics controller 270 can execute the instructions to control the robotics system 200 to navigate to the coordinate location of the object referenced in the audio data 206, to pick up the object, and to then navigate the robotics system 200 back to its current location to complete a retrieve action.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

While the foregoing embodiments have been predominantly described with reference to the development or processing of speech inputs for use with applications installed on user devices, the described features may also be used with respect to machines, other devices, robots, or other systems. For example, the described systems and methods may be used to improve user interactions with machinery, where the machinery has an associated computing system, may be used to develop and implement voice actions for interacting with a robot or system having robotic components, may be used to develop and implement voice actions for interacting with appliances, entertainment systems, or other devices, or may be used to develop and implement voice actions for interacting with a vehicle or other transportation system.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
- storing information indicative of objects in an environment of a robot;
- detecting, based on sensor data that is captured by the robot and that describes a first region, a user in the environment;
- determining, based on a location of the detected user, a second region outside the first region described by the sensor data;
- accessing a portion of the stored information indicating locations of one or more objects in the second region;
- identifying, based at least on the accessed portion of the stored information, an object that that is located in the second region; and
- causing the robot to perform an action associated with the identified object that is located in the second region.

2. The computer-implemented method of claim 1, wherein the sensor data comprises image data or video data generated using a camera of the robot, the second region being a spatial region that is not shown in the image data or video data.

3. The computer-implemented method of claim 1, wherein the stored information comprises (i) map data that indicates coordinates of the one or more objects and (ii) data indicating an object type for each of the one or more objects.

4. The computer-implemented method of claim 1, wherein the stored information comprises records of objects that the robot previously observed in the second region.

5. The computer-implemented method of claim 1, wherein the stored information comprises image data or video data captured by the robot.

6. The computer-implemented method of claim 1, wherein identifying the object is based on a transcription of one or more words spoken by the user.

7. The computer-implemented method of claim 1, wherein determining the second region is based on a glance of the user.

8. The computer-implemented method of claim 1, further comprising:
- determining a location of the robot in a space, wherein determining the second region is based on the location of the robot within the space.

9. The computer-implemented method of claim 1, further comprising:
- determining an orientation of the robot when the sensor data is captured, wherein determining the second region is based on the orientation of the robot.

10. The computer-implemented method of claim 1, wherein the action associated with the identified object is an action for the robot to retrieve the identified object.

11. The computer-implemented method of claim 1, wherein identifying the object comprises selecting, from among multiple objects of a type indicated by a voice input, a particular object based on a determination that the particular object is located in the second region.

12. The computer-implemented method of claim 1, further comprising:
- detecting one or more predetermined shapes from the sensor data; and determining one or more locations of the detected one or more predetermined shapes within the sensor data, wherein the second region is based at least on the one or more predetermined shapes and the one or more locations of the detected one or more predetermined shapes within the sensor data.

13. The computer-implemented method of claim 1, further comprising determining a location of the identified object within the second region.

14. The computer-implemented method of claim 13, wherein the location of the identified object within the second region is represented by a set of coordinates.

15. The computer-implemented method of claim 1, wherein the sensor data includes at least one of image data, infrared image data, light detection and ranging (LIDAR) data, thermal image data, night vision image data, or motion data.

16. The computer-implemented method of claim 1, wherein the robot is configured to obtain image data for a field of view of a camera of the robot, and wherein the second region is at least partially outside the field of view of the camera of the robot before causing the robot to perform the action.

17. A system comprising:

one or more sensors;

one or more processors; and one or more machine-readable media storing instructions that, when executed by the one or more processors, cause the system to perform operations comprising:

storing information indicative of objects in an environment of a robot;

detecting, based on sensor data that is captured by a robot and that describes a first region, a user in the environment;

determining, based on a location of the detected user, a second region outside the first region described by the sensor data;

accessing a portion of the stored information indicating locations of one or more objects in the second region;

identifying, based at least on the accessed portion of the stored information, an object that that is located in the second region; and causing the robot to perform an action associated with the identified object that is located in the second region.

18. The system of claim 17, wherein the sensor data comprises image data or video data generated using a camera of the robot, the second region being a region that is not shown in the image data or video data.

19. The system of claim 17, wherein the stored information comprises (i) map data that indicates coordinates of the one or more objects and (ii) data indicating an object type for each of the one or more objects.

20. One or more non-transitory machine-readable media storing instructions that, when executed by one or more processors, cause the one or more processors to perform operations comprising:

storing information indicative of objects in an environment of a robot;

detecting, based on sensor data that is captured by a robot and that describes a first region, a user in the environment;

determining, based on a location of the detected user, a second region outside the first region described by the sensor data;

accessing a portion of the stored information indicating locations of one or more objects in the second region;

identifying, based at least on the accessed portion of the stored information, an object that that is located in the second region; and causing the robot to perform an action associated with the identified object that is located in the second region.

* * * * *